United States Patent
Piepenbreier et al.

(10) Patent No.: US 12,479,795 B2
(45) Date of Patent: Nov. 25, 2025

(54) PROCESS FOR MANUFACTURING ALKANESULFONIC ACIDS

(71) Applicant: BASF SE, Ludwigshafen (DE)

(72) Inventors: Frank Piepenbreier, Ludwigshafen (DE); Andreas Kempter, Ludwigshafen (DE); Bjoern Kaibel, Ludwigshafen (DE); Frieder Borgmeier, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 789 days.

(21) Appl. No.: 17/766,084

(22) PCT Filed: Sep. 23, 2020

(86) PCT No.: PCT/EP2020/076570
§ 371 (c)(1),
(2) Date: Apr. 1, 2022

(87) PCT Pub. No.: WO2021/063768
PCT Pub. Date: Apr. 8, 2021

(65) Prior Publication Data
US 2022/0348537 A1    Nov. 3, 2022

(30) Foreign Application Priority Data
Oct. 2, 2019  (EP) .................................. 19201029

(51) Int. Cl.
| | | |
|---|---|---|
| *C07C 303/44* | (2006.01) |
| *B01D 1/00* | (2006.01) |
| *B01D 3/00* | (2006.01) |
| *B01D 5/00* | (2006.01) |
| *C07C 303/06* | (2006.01) |

(52) U.S. Cl.
CPC .......... *C07C 303/44* (2013.01); *B01D 1/0041* (2013.01); *B01D 3/007* (2013.01); *B01D 5/0039* (2013.01); *B01D 5/006* (2013.01); *C07C 303/06* (2013.01)

(58) Field of Classification Search
None
See application file for complete search history.

(56) References Cited

FOREIGN PATENT DOCUMENTS

| | | |
|---|---|---|
| WO | 2015/071455 A1 | 5/2015 |
| WO | 2018/096138 A1 | 5/2018 |
| WO | 2018/146153 A1 | 8/2018 |
| WO | 2018/208701 A1 | 11/2018 |
| WO | 2018/219726 A1 | 12/2018 |
| WO | 2019/154681 A1 | 8/2019 |
| WO | 2021/023582 A1 | 2/2021 |

OTHER PUBLICATIONS

Diaz-Urrutia, et al., "Activation of methane: A selective industrial route to methanesulfonic acid", Science, vol. 363, Issue 6433, Mar. 22, 2019, pp. 1326-1329.
European Search Report for EP Patent Application No. 19201029.6, Issued on Mar. 16, 2020, 3 pages.
International Search Report for PCT Patent Application No. PCT/EP2020/076570, Issued on Nov. 27, 2020, 3 pages.
Kappenthuler, et al., "Environmental assessment of alternative methanesulfonic acid production using direct activation of methane", Journal of Cleaner Production, vol. 202, Nov. 20, 2018, pp. 1179-1191.

*Primary Examiner* — Amy C Bonaparte
(74) *Attorney, Agent, or Firm* — ArentFox Schiff LLP

(57) ABSTRACT

The present invention relates to an improved process for the production of alkanesulfonic acids.

16 Claims, 1 Drawing Sheet

PROCESS FOR MANUFACTURING ALKANESULFONIC ACIDS

CROSS-REFERENCE TO RELATED APPLICATIONS

Figure 1:
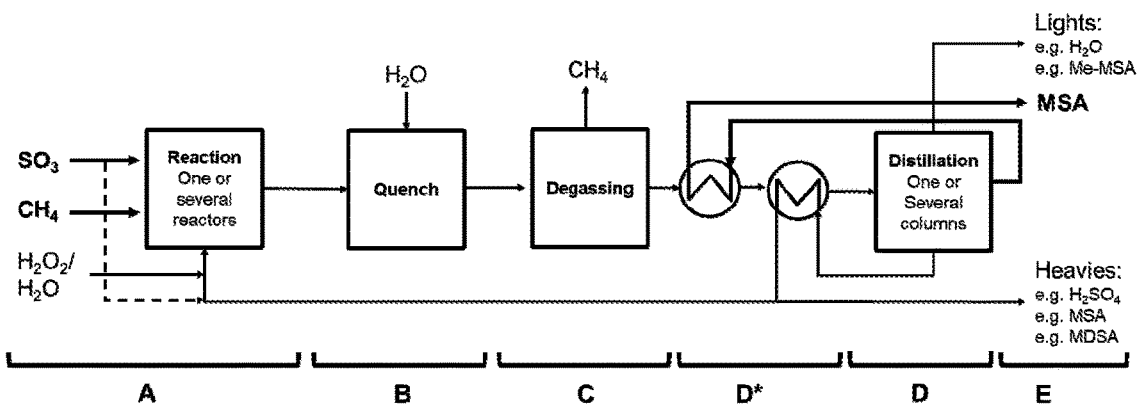

This application is a National Stage Entry of PCT/EP2020/076570, filed Sep. 23, 2020, which claims priority to EP Application Serial No. 19201029.6, filed Oct. 2, 2019, the disclosures of each of which are hereby incorporated by reference in their entirety.

The present invention relates an improved process to produce alkanesulfonic acids from sulfur trioxide and an alkane. The improved process offers a significant reduction of the energy demand through heat integration. The present invention further relates to heat exchanger devices used for heat integration in the presence of highly corrosive media.

An alkanesulfonic acid with a high commercial importance is methanesulfonic acid (MSA). MSA is a strong organic acid, which is, inter alia, used in the galvano industry, in chemical synthesis, in cleaning applications, in the biodiesel industry and many other applications.

WO 2015/071455 describes a process in which an alkanesulfonic acid is formed from $SO_3$ and an alkane with help of an alklysulfonyl peroxide as an initiator. Furthermore, the recovery of methanesulfonic acid by means of distillation is described. The bottom product of the distillation can be recycled to the reaction stage of the process. This stream can be used for the formation of the radical initiator by the addition of $H_2O_2$ and similarly for the formation of fresh Oleum by the addition of pure $SO_3$ and as solvent for the reaction. No further details about the process are given.

WO2018/146153 relates to a production process for methanesulfonic acid from methane and $SO_3$, that involves the reaction with a carbocation. A scheme of the process for the reaction to MSA comprises a cascade of reactors and a distillation column for the recovery of MSA with high selectivity and yield. No information about the energy supply in the process is given.

WO2018/208701 aims at the recovery of MSA after it was formed in a radical reaction from methane and $SO_3$. The patent claims the processing of unconverted $SO_3$ with preferably water to form a heavy boiling compound like sulfuric acid after depressurization. It is mentioned, how the heat released in this reaction is used. Furthermore, a distillation column for the purification is described, but the heat management in the process is not addressed.

Díaz-Urrutia, Ott, *Science*, 2018, pp. 1326-1329: Díaz-Urrutia and Ott report the operation of a pilot plant for the production of MSA from $SO_3$ and methane with the help of an electrophilic initiator. The reaction is carried out in a cascade of reactors at high pressure. After depressurization the unconverted $SO_3$ is quenched with water in a glass reactor. The mixture after the quench step is transferred to a vacuum distillation column. The column is operated at a pressure of 10 mbar and a max temperature of 220° C. The authors state, that MSA with a purity of 99.9% is recovered as the distillate, while a mixture of $MSA/H_2SO_4$ as a bottom product is recycled back to the reactor cascade. The energy consumption of the pilot plant is not addressed in this publication.

A publication by Kappenthuler et al. [*Journal of Cleaner Production*, 202, 2018, pp. 1179-1191] evaluates the ecological impact of the production of MSA from $SO_3$ and methane compared to the oxidation of dimethyl disulfide. The energy consumption of both processes is estimated but heat integration within the production processes is not considered.

WO2019/154681 discloses a process for the production of colorless methansulfonic acid with a high yield by providing methane with a high purity. It is described, that methane can be purified by pressure swing adsorption (PSA). Then, methanesulfonic acid is synthesized from purified methane and sulfur trioxide at elevated pressure. After the MSA synthesis, the reactor outlet is pressurized and methane is released. It is mentioned that the released methane can be incinerated to produce energy.

WO2019/154681 describes the supply of energy by the incineration of methane released from the reaction. However, in this patent the use of methane with a high purity is described. The provision of pure gases requires upstream expensive purification steps, e.g. pressure swing adsorption (PSA). A PSA unit consists of several pressure vessels filled with an adsorbent and equipped with complex compressors and process control systems. Consequently, it will be the aim of the process design to convert valuable methane is far as possible to a valuable product and to minimize the amount of (expensive) methane, which must be released and burned. As will be shown in Comparative Example 3, the amount of methane released from the reaction step is by far to small to power the process, especially the purification step.

As set out above, energy consumption of the manufacturing process is mostly not mentioned in the prior art, or is described only at a general level. Thus, there remains a need in the art to provide an energy effective process for manufacturing alkane sulfonic acids from an alkane and SO3.

In the light of the prior art, the technical problem to be solved by the present invention therefore is the provision of an energy effective process to produce alkanesulfonic acids from an alkane and sulfur trioxide.

As methanesulfonic acid is (from an economical perspective) the most important of the short chain alkanesulfonic acids, i.e. alkanesulfonic acids having 1 to 4 C-atoms, the invention provides a process especially for an energy effective process for the production of methanesulfonic acid by reacting methane with SO3 in the presence of an initiator. In particular, a process is provided, in which large temperature gaps between the different process steps are overcome with reduced energy demand. Another aspect of the present invention relates to the high corrosivity of the media in processes for the production of alkanesulfonic acids. In a preferred embodiment, the process according to the invention provides a set-up with heat exchangers which can withstand high temperatures up to 220° C. in combination with highly corrosive media containing alkanesulfonic acids and sulfuric acid.

SUMMARY OF THE INVENTION

The present invention relates to an improved process for the production of alkanesulfonic acids from sulfur trioxide and an alkane with the help of an initiator. The invention provides a process especially for an improved process for the production of methanesulfonic acid by reacting methane with SO3 in the presence of an initiator.

In the context of the present disclosure, the terms "initiator" and "starter" may be used synonymously. Both terms refer to a compound which is able to initiate (i.e. start) a chemical reaction, in particular the reaction of an alkane with sulfur trioxide.

The initiator may selected from the group consisting of inorganic peroxoacids, salts of inorganic peroxoacids, organic peroxoacids, salts of organic peroxoacids, and mixtures thereof. As mentioned, the initiator may be selected from inorganic or organic peroxoacids or salts thereof, as e.g. a peroxosulfuric acid comprising at least one peroxosulfuric acid of boron, silicon, phosphorus, carbon, nitrogen or sulfur. Consequently, typical initators may be Caro's acid, Marshall's acid, dimethylsulfonylperoxide, monomethylsulfonylperoxide etc A preferred initiator is hydrogen peroxide.

The present invention relates, in particular, to a process for the production of alkanesulfonic acids from an alkane and SO3 with the help of an initiator, characterized in that the total energy consumption of the process is reduced by heat integration.

The present invention also relates to a process for the production of alkanesulfonic acids from an alkane and SO3 with the help of an initiator comprising a distillation step, wherein the total energy consumption of the process is reduced by heat integration, wherein the feed to the distillation step is heated by heat integration with the hot stream of purified alkanesulfonic acid, and/or the feed to the distillation is heated by heat integration with the hot distillation residue, and/or the feed to the distillation is first heated by heat integration with the hot purified alkanesulfonic acid and then by heat integration with the hot distillation residue, and/or the feed to the distillation is heated by heat integration with the hot stream from mixing the alkanesulfonic acid with water to yield an aqueous solution.

A further object of the present invention is also an alkanesulfonic acid, obtainable by the inventive process.

The present invention also relates to a process for the production of alkanesulfonic acids from an alkane and SO3 with the help of an initiator, comprising the following steps A synthesis of initiator and reaction of alkane with SO3 to form alkanesulfonic acid, B quench to convert SO3 into a heavy boiler, C removal of unreacted alkane by decompression (degassing), D purification of alkanesulfonic acid by distillation, D* pre-heating of feed to distillation by heat integration, and E discarding of waste streams (purge).

The synthesis of the initiator (step A) may be performed in the same reactor as the following reaction of alkane with SO3. In another embodiment of the inventive process, the synthesis of the initiator in step A may be performed in a different reactor than the subsequent reaction of alkane with SO3 (in the presence of/using the intiator).

This process comprises a reaction step, in which the initiator is formed and the alkanesulfonic acid is formed (step A), preferably a quench step in which remaining SO3 is converted to a heavy boiler (step B), a decompression or degassing step (step C), and a distillation step for the purification of the alkanesulfonic acid (step D). One fraction of the bottom residue of the distillation is removed from the process (also called "purge", step E) and optionally another fraction is recycled to the reaction.

The inventive process is characterized in that the energy it contains is made use of internally rather than adding energy from an external energy source. Thus, heat is transferred from the hot streams, e.g. the streams leaving the distillation step, to cold streams, e.g. those entering the distillation step, by means of one or several heat exchangers thus significantly reducing the amount of additional energy which needs to be provided to the process compared to the prior art.

Another source of heat in the process is in the alkane, particularly in the methane, leaving step C when decompressing the system. This alkane, especially methane, can be incinerated and the heat generated in this way, in this case contained as a hot gas, be used directly for heat integration via a heat exchanger, or after transferring its heat to a heat transfer liquid in a heat exchanger and then from the heat transfer liquid into the cold process stream which needs to be heated up in another heat exchanger. Moreover, the heat of a further optional step downstream to the distillation, namely the formulation of the alkanesulfonic acid with water to yield an aqueous solution (step F), e.g. formulating methanesulfonic acid 100% (free of water) to an aqueous solution with an MSA content of 70 wt.-% by addition of water, can be used to pre-heat the feed to the distillation and in this manner contribute to reduce the demand of external, i.e. additional energy for heating and cooling the respective process streams. Another option to reduce the energy demand according to this invention is to operate the quench step adiabatically. By this means the energy demand required for heating and cooling the respective streams is significantly reduced.

In one embodiment of the inventive process, the feed to the distillation step is heated by heat integration with the hot stream of purified methanesulfonic acid from the distillation step. Heat integration is a method which in this invention is applied when there is the chance to save energy by heating up one stream or several streams and at the same time cooling down another stream or several streams. The heat transfer is realized through a heat exchanger, in which the cold stream is heated up by the hot stream while the hot stream itself is cooled down. If there are several streams to be cooled down and heated up, for each combination of hot stream for heating and cold stream for cooling down a dedicated heat exchanger is used. In general, heat integration according to this invention works by transferring heat from any of the hot streams of step A to F to any of the cold streams of step A to F as long as the temperature levels are suitable for an effective heat transfer. Streams at suitable temperature levels have a temperature difference between the stream with the higher temperature level which needs to be cooled down and the stream with the lower temperature level which needs to be heated up of at least 5° C., preferred of at least 10° C. and more preferred of at least 15° C. But it may also be sufficient if the temperature levels just have a difference as low as 2° C. or 3° C. or 4° C. There is no requirement for the maximum temperature difference of the streams at higher and lower temperature level, but based upon considerations of practicability and the integrity of the heat exchangers, e.g. regarding thermal stress and/or corrosivity of the process streams, the maximum temperature difference of the incoming stream at higher temperature level and the incoming stream at lower temperature level should be no more than 220° C., preferred no more than 200° C. and most preferred no more than 180° C.

In a further embodiment of the inventive process, the feed to the distillation is heated by heat integration with the hot distillation residue leaving the bottom of the distillation column or set of distillation columns.

In another embodiment of the inventive process, the feed to the distillation step is heated by heat integration with the hot stream generated when mixing the alkanesulfonic acid with water to yield an aqueous solution (formulation step).

In a preferred embodiment of the inventive process, the feed to the distillation is heated by heat integration with the hot purified alkanesulfonic acid and the hot distillation residue in a sequence of heat transfer steps. More preferably, the feed to the distillation is first heated with hot purified alkanesulfonic acid and then, the feed is further heated with the hot bottom residue of the distillation step.

In another embodiment of the inventive process, the evaporators of the distillation are powered by steam and steam condensate coming from the evaporators of the distillation is used to heat the feed to the distillation.

In yet another embodiment of the inventive process, the energy released in the condensers of the distillation step is used to heat up the feed to the distillation.

In a preferred embodiment of the inventive process, the feed to the distillation is further heated to the distillation temperature after the heat integration steps described above powered by steam, by electrical power, by heating oil, by hot water (typically operated under elevated pressure to reduce or completely avoid evaporation of the water) or by other suitable energy sources.

Another embodiment of the inventive process, the feed to the distillation flows to the distillation applying a combination of all options named above to reduce the energy demand for heating or cooling of the system, respectively. This is to heat the feed to the distillation by heat integration with the hot streams from the purified product from distillation while still hot, with the hot distillation residue leaving the bottom of the distillation column, with the hot steam condensate from the evaporators of the distillation, with the hot cooling fluid from the condensers of the distillation and with the hot stream from the formulation step.

While heat integration with the different options named above helps to reduce energy consumption if just one of the options is applied, it is preferred to set-up the process applying at least two or all of the options to reduce the demand of external energy supply to the process for heating and cooling the respective streams.

It is particularly preferred if heat integration is realized in a sequence where the temperature of the streams used to heat the feed to the distillation column increases step by step, meaning that after operating the quench in adiabatic mode, heating of the feed to distillation is first done with the hot stream from the formulation step, followed by heating with the hot purified alkanesulfonic acid from distillation, followed by heating with the even hotter distillation residue leaving the bottom of the distillation column, and finally heating of the feed to distillation is done by providing external energy sources as e.g. steam or heating oil or hot water or other suitable energy sources.

Alternatively, the hot process streams used for the sequence of pre-heating can be switched.

In one embodiment of the invention the feed to the distillation is pre-heated by a one-or-multistep of heat integration and/or external heating so that the difference between the feed temperature to the distillation and the operating temperature in the distillation column at the feeding point is less than 100° C., preferred less than 50° C. and more preferred less than 30° C. or even more preferred less than 10° C. The temperature difference between feed and distillation can also be designed to be less than 8° C., or less than 5° C., or less than 3° C. or even less than 1° C.

In a further embodiment of the inventive process the feed to the distillation is heated above, below or exactly to the boiling point. Therefore, the feed can enter the column as a subcooled liquid, an overheated liquid, a boiling liquid or as a vapor. It is preferred, that the feed enters the column as a boiling liquid or as an overheated liquid (flash).

In one embodiment of the inventive process, each heat integration step is carried out in a dedicated heat exchanger or set of heat exchangers having the same functionality.

In a preferred embodiment of the inventive process, the heat exchangers installed for heat integration are made of a material selected, separately from each other, from the group consisting of silicon carbide (SiC, SSiC), Titanium, Tantalum, Gold, Hastelloy or glass-lined steel. More preferably, silicon carbide (SSiC) is used in at least one, preferably in all of the heat exchangers. The heat exchangers may be e.g. of tube or tube bundle type, U-tube type, plate type or monolith type. In a preferred embodiment, the heat exchangers are monoliths of pressureless sintered silicon carbide (SSiC). Sealings can e.g. be made of PFA or PTFE.

In a preferred embodiment of the inventive process, the heat in the heat integration step is transferred from the hot streams leaving the distillation to the cold feed directly without a heat transfer fluid in one apparatus.

In a further embodiment of the inventive process, the heat in the heat integration step is transferred from the hot streams leaving the distillation to the cold feed with the help of a heat transfer fluid. In this case the heat transfer fluid is first heated by the hot streams leaving the distillation and then releases the heat to the cold feed stream. Aliphatic and cyclic hydrocarbons as well as silicon oils can be used advantageously as heat transfer fluids.

In one embodiment of the inventive process, the quench step is operated isothermally.

In a preferred embodiment of the inventive process, the quench step is operated adiabatically.

In a further embodiment of the inventive process, remaining alkane from the synthesis of alkanesulfonic acids is incinerated to supply heat. The heat supplied by the incineration of methane can be used directly, i.e. as hot gas, or it can be used to generate steam or to heat up heat transfer fluids. The heat supplied by the incineration of methane can further be used to heat the feed to the distillation and/or to power the evaporators of the distillation.

DETAILED DESCRIPTION OF THE INVENTIVE PROCESS

Figure 3:
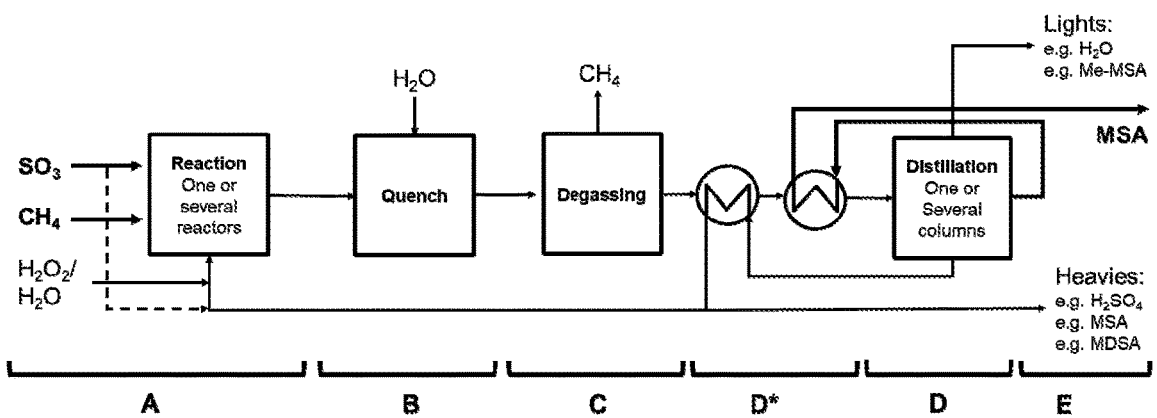

This invention relates to an optimized process for the production of alkanesulfonic acids. In the following a detailed exemplary description of the process according to one embodiment of the present invention is given for the case that the alkane is methane and methanesulfonic acid (MSA) is formed in the reaction:

The schematic flow chart of one embodiment of the present invention is shown in FIG. 1. A further embodiment of the inventive process is shown in FIG. 3.

Figure 2:
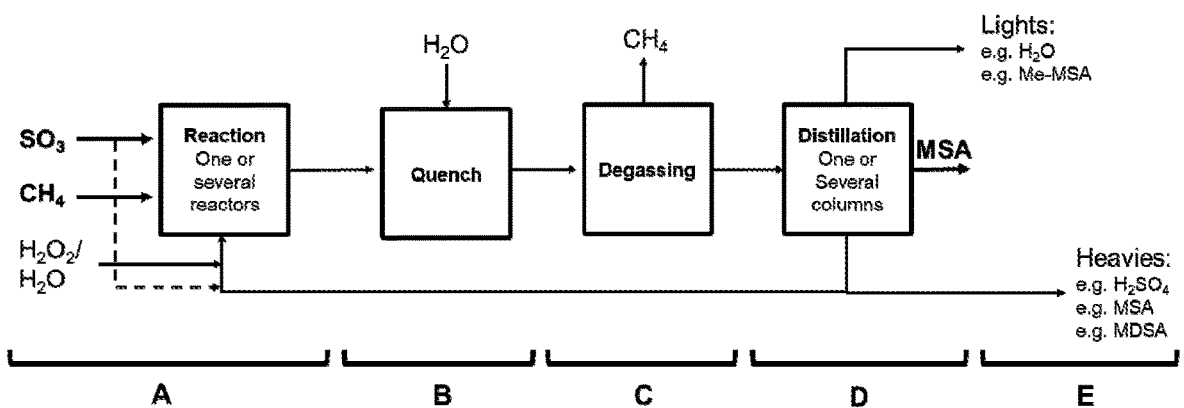

FIG. 2 depicts an exemplary process for the production of MSA from methane and SO3 without heat integration.

MSA can be produced from sulfur trioxide and methane in the following steps:

A Reaction: Methanesulfonic acid (MSA) is formed from methane and $SO_3$ with a mixture of MSA and sulfuric acid as a solvent.

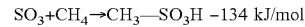

$$SO_3 + CH_4 \rightarrow CH_3\text{---}SO_3H \; -134 \text{ kJ/mol} \qquad 1$$

The reaction usually takes place at pressures from 10 to 200 bar and temperatures ranging from 25 to 100° C. In a preferred mode the pressure is between 30 to 150 bar, more preferred between 50 and 110 bar, most preferred between 70 and 100 bar. In a preferred mode of operation, the temperature is between 25 to 100° C., preferred between 40 to 80° C., more preferred between 45° C. and 65° C. The reaction is triggered with the help of an initiator (also called "starter"), which is prepared with H2O2. The peroxide initiator is prone to decomposition at elevated temperatures, therefore—in addition to controlling the reaction temperature within the limits given above—cooling is preferably applied when producing the initiator precursor solution and/or during preparation of the initiator solution. Cooling can be applied to one or more of the individual raw material streams and/or to the mixing process itself when generating the initiator precursor solution and/or the initiator solution from of the initiator raw materials, comprising e.g. a solution of hydrogen peroxide, SO3, oleum, the recycle stream leaving the distillation step at the bottom of the column consisting mainly of sulfuric acid and the respective alkanesulfonic acid, when using methane as alkane methanesulfonic acid, and small amounts of other high boilers, e.g. methyldisulfonic acid. Preferably, the initiator solution or initiator precursor solution itself is cooled in a first step, and then it is mixed under further cooling with the pre-cooled recycle stream leaving the distillation as a bottom residue. These process steps are preferably performed at temperatures <50° C., preferred <25° C., and most preferred <10° C. or even <5° C. or <0° C. or <−5° C.

For the cooling of the synthesis of the starter/initiator and MSA the following cooling media can be used: water, aqueous salt solutions, organic liquids like aliphatic or aromatic oils, poly glycols etc.

The liquid phase in the reactors is transferred to the next process step B. The reaction mixture leaving step A consists mainly of MSA, $H_2SO_4$ and unconverted reactants (e.g. $SO_3$ and methane). Apart from that the solution leaving the reactors in most cases contain side products of the reaction like methanesulfonic acid anhydride (MSA-anhydride), methanesulfonic methylester (Me-MSA), Methyl bisulfate (MBS) or methyldisulfonic acid (MDSA).

Unconverted methane from the synthesis of MSA can be incinerated to supply heat for other process steps. By incinerating methane, steam can be generated. Steam can be used as a heat source in process step D and/or in process step D*. Additionally (or alternatively), by incinerating methane heat transfer fluids can be heated to supply heat especially in process step D and process step D*.

B Quench: The remaining $SO_3$ and MSA-anhydride can be converted with water to $H_2SO_4$ and MSA respectively either when the reaction mixture is still under $CH_4$ pressure (above ambient pressure) or when the reaction solution is already decompressed (ambient pressure or below). If the conversion of $SO_3$ is close to 100%, e.g. between 95 and 100%, and the combined selectivity towards MSA and optionally MSAA is close to 100%, e.g. 90 to 100%.

It is one option within the scope of the present invention that the reaction mixture might be processed further without step B. However, it is preferred to include step B in the process even if SO3 conversion and the selectivity to MSA and optionally MSAA are high. the reaction of SO3 with water to sulfuric is highly exothermic ($\Delta H^R = -132$ kJ/kg). Depending on the composition of the reaction mixture, the quench step might be operated isothermal or adiabatic. In an adiabatic operation of the quench step, the released heat of reaction leads to a temperature rise in the quench. Consequently, the temperature gap to the distillation step (see below, step D) is reduced.

C Degassing/Decompression: By reducing the pressure in step C a light boiling stream consisting mainly of methane and a heavy stream consisting of mainly MSA and sulfuric acid is formed. Process steps B and C can be combined in one apparatus.

Unconverted methane from the synthesis of MSA can be incinerated to supply heat for other process steps. By incinerating methane, steam can be generated. Steam can be used as a heat source in process step D and/or in process step D*. Additionally (or alternatively), by incinerating methane a hot gas stream us generated which can be used as heat source directly, heat transfer fluids can be heated with steam or directly with hot gas from incineration of methane to supply heat in process step D and process step D*. However, as will be highlighted in Comparative Example 3, the power required for the MSA purification exceeds the power, that can be supplied by burning methane coming from step C.

D MSA purification: The feed from step C can be sent directly to the distillation without further heat treatment. However, it is preferred that the feed to the distillation is subject to a pre-heating step to reduce energy consumption for the overall process by heat integration as described below under step D*. The feed to the distillation can enter the column at a temperature above or below the boiling point. It is preferred, that the feed entering the column is a boiling liquid or as an overheated liquid (flash).

The feed to the purification contains mainly MSA and sulfuric acid. Additionally, water and reaction side products can be present. MSA can be recovered by distillation. Depending on the exact composition of the feed stream entering step D and the distillation concept, purified MSA is obtained from side-discharge (WO2018/219726) or from the bottom of a distillation column (Unpublished patent application EP 19190621.3, BASF reference: 191048EP01). The distillation step may consist of one column or a set of several columns with different functionality. Depending on the capacity and the design of the column or set of columns, each column may be realized as one column or as a set of columns in parallel having the same functionality. In general, all distillation columns are operated under reduced pressure in the range of from 0.1 to 50 mbar, preferably 2 to 30 mbar, more preferably 3 to 20 mbar and most preferably 5 to 15 mbar (all values given as absolute pressure at the heads of the columns and evaporators). Both bottom temperatures of the distillation columns and residence times in the bottom section of the distillation (i.e. the volume in the sump of the columns including heat exchangers, pumps, piping etc.) should be kept as low as possible to avoid decomposition of MSA. For this reason, the bottom temperatures are controlled to be typically between 140° C. and 220° C., preferably between 150 and 210° C., more preferably between 160° C. and 200° C. and most preferably between 165 and 195° C. or 170 and 190° C. The feed to the distillation column is preheated to the distillation temperature of 150° C. till 200° C. as described in step D*. Regardless of the distillation concept, purified MSA leaves the distillation step D with a temperature of 150° C. till 200° C. The bottom residue of such a distillation mainly consists of MSA and sulfuric acid. Regardless of the distillation concept this stream has a temperature of 150° C. till 220° C. Typically, the temperature of the purified MSA leaves the distillation column at a lower temperature than the bottom residue.

D* Heat integration: To heat up the feed to the distillation (step D), the heat streams leaving the distillation may be used as described earlier. This leads to a massive reduction of the energy demand of the process. The heat streams leaving the distillation are the streams with purified MSA and the bottom stream leaving the distillation mainly consisting of MSA and sulfuric acid. Only one stream or both streams can used to heat up the feed to the distillation. Preferably, both streams are used. More preferably, first the heat is first transferred from the hot purified MSA and then from hot bottom residue to the solvent. Further sources of heat streams can be used to further optimize, i.e. reduce energy consumption of the overall process, e.g. the hot stream generated when mixing MSA with water to a target concentration (formulation of MSA, step F), or the heat stream generated when incinerating methane as outlined above in step C. As a heat exchanger device, heat exchangers made of a material selected, separately from each other, from the group consisting of silicon carbide (SiC, SSiC), Titanium, Tantalum, Gold, Hastelloy or glass-lined steel are preferred. Preferably, heat exchangers made of sintered silicon carbide (SSiC) are used. More preferably the heat exchangers contain one or several SSiC monoliths or SiC tubes. The SiC monolith are tubes can be enclosed in a shell made of stainless steel, PTFE/PFA lined steel or glass-lined steel.

Devices of this kind allow a direct heat transfer from the hot stream to the cold stream, either using the hot and the cold stream directly or with a heat transfer fluid. Using the hot and the cold stream directly, i.e. without a heat transfer fluid, is preferred. Alternatively, other types of heat exchangers can be used, e.g. heat exchangers containing glass-lined steel tubes. Usually these types of heat exchangers require a heat transfer medium which for example is based upon aliphatic or cyclic hydrocarbons or silicon oil. Further potential materials of construction comprise gold, tantalum, titanium, or Hastelloy.

The feed to the distillation cannot be heated up completely to the temperature of the feed tray by heat integration as long as the methane set free in step C is not considered. Preferably, the feed is further heated to the feed temperature at the feeding point in the distillation column by a heat exchanger prior to the distillation column powered with steam. Alternatively, this heat exchanger can be powered electrically or with a heat transfer fluid, e.g. aliphatic or cyclic hydrocarbons or silicon oil. As soon as incinerating methane from step C is considered for the energy balance of the overall process, sufficient heat is provided process-internally to heat up the feed to the distillation up to the temperature level of the feed tray, e.g. heat in the form of steam. Providing energy process-internally by incinerating methane, i.e. without using additional external energy for the process, is preferred.

While heating up the feed stream to the distillation step, the hot streams leaving the distillation are cooled. This is beneficial, because the purified MSA needs to be cooled for formulation and packing. The bottom residue of the distillation needs to be cooled for further processing as described below. Eventually, the streams leaving the distillation cannot be cooled completely to the desired temperature in step D*. Further cooling can be achieved with for example, air cooling, cooling water or other cool fluids available in a chemical production plant. Especially when cooling water is applied it may contain additives like anticorrosion additives and/or anti-fouling additives and/or bioactive compounds keeping number and amount of organisms on a low level or even reducing them to zero.

Moreover, it is possible to extend the heat integration of step D* to process step B or process step C or both steps B and C.

D→A Solvent Recirculation: One fraction of the residue from the MSA purification can be recirculated to step A as solvent for the reaction. $H_2O_2$ can be added to this stream or to a part of this stream to obtain fresh initiator. In one mode of operation, this recirculated stream is cooled. In another mode of operation, $H_2O_2$ is added to the cooled recirculated stream or a part of it under intensive mixing and cooling. Moreover, $SO_3$ can be added to this stream or to a part of this stream to load the reactor(s) with reactant and solvent, respectively. In another mode of operation, $SO_3$ is added to the cooled recirculated stream or a part of it with $H_2O_2$ under intensive mixing and cooling. Alternatively, $H_2O_2$ and $SO_3$ can be added simultaneously to the pre-cooled recirculated stream or to a part of it under intensive mixing and cooling. In another embodiment, $SO_3$ and/or $H_2O_2$ can directly be added into one or several of the reaction vessels of Step A.

E Waste stream: Sulfuric acid is formed in the process, especially in step B, and undesired accumulation of sulfuric acid in the recirculated stream must be prevented. Therefore, the other fraction of the purification residue needs to be removed from the process and e.g. be discarded as a waste stream (also called "purge"). For an economic operation the purge stream should be kept to a minimum.

EXAMPLES

In the following paragraphs, several examples are described to illustrate some aspects of the present invention.

In all examples the energy demand refers to 1 kg of purified MSA. For the heat transfer a temperature difference of 10 K was assumed. The heat capacity of all streams is 1.41 kJ/(kg K).

Comparative Example 1

In a process for the production of MSA from methane and SO3 without heat integration (FIG. 2), the feed stream to the distillation is heated in a heat exchanger prior to the distillation step D. In a typical operation, the stream leaving step C has a temperature of about 50° C. and the feed tray of the first distillation column has a temperature of about 170° C. To produce 2000 kg/h of purified MSA, the feed to the distillation column has a flow rate of 3100 kg/h and consists of 75 wt.-% MSA and 25 wt.-% sulfuric acid with side products <<1 wt.-%. The energy required to heat up this stream from 50 to 160° C. is 241 kJ/kg(MSA).

At the same time, the hot purified MSA with a flow rate of 2000 kg/h and the same heat capacity has to be cooled down from 160° C. to 30° C. for formulation and packing. Additionally, the bottom stream leaving the distillation has flow rate of 1111 kg/h. It leaves the distillation column with a temperature of 185° C. and must also be cooled to a temperature of 30° C. for further processing. These cooling operations together require a cooling duty of 305 kJ/kg (MSA).

Comparative Example 2

In a process for the production of MSA from methane and SO3 without heat integration (FIG. 2) the feed stream to the distillation is heated directly in the distillation column. In a typical operation, the stream leaving step C has a temperature of about 50° C. and the feed tray of the first distillation column has a temperature of about 170° C. To produce 2000 kg/h of purified MSA, the feed to the distillation column has a flow rate of 3100 kg/h and consists of 75 wt.-% MSA and 25 wt.-% sulfuric acid with side products <<1 wt.-%. The energy required to heat up this stream from 50 to 160° C. is 241 kJ/kg(MSA).

At the same time, the hot purified MSA with a flow rate of 2000 kg/h and the same heat capacity has to be cooled down from 160° C. to 30° C. for formulation and packing. Additionally, the bottom stream leaving the distillation has flow rate of 1111 kg/h. It leaves the distillation column with a temperature of 185° C. and must also be cooled to a temperature of 30° C. for further processing. These cooling operations together require a cooling duty of 305 kJ/kg (MSA).

Comparative Example 3

In order to produce 2000 kg/h of purified MSA, MSA is synthesized from SO3 and methane in step A at 100 bar and 50° C. Then, the liquid reactor outlet is passed from step A to step B and the rest of SO3 is quenched at the pressure of step A. Afterwards about 3100 kg/h of liquid are transferred to step C and are depressurized. At the reaction conditions of 100 bar and 50° C. the solubility of methane is 0.003 kg/kg. When the liquid is depressurized to atm. pressure in step C, 9.3 kg/h of methane are released. If this amount of methane is burned (assumptions: 100% efficiency, ca. 800 kJ/mole) about 130 kW of heat can be generated. To power the purification of 2000 kg/h MSA in step D at least 1000 kW are required. Therefore, additional measures are needed, the reduce the energy of the process.

Example 1

In an example according to the inventive process for the production of MSA from methane and SO3 with heat integration, the feed to the distillation is first heated with the hot purified MSA and then with the hot bottom residue of the distillation (cf. schematic illustration in FIG. 1). The stream leaving step C has a temperature of about 50° C. and the feed tray of the first distillation column has a temperature of 170° C. To produce 2000 kg/h of purified MSA, the feed to the distillation column has a flow rate of 3100 kg/h and consists of 75 wt.-% MSA and 25 wt.-% sulfuric acid with side products <<1 wt.-%. Purified MSA leaves the distillation step with a temperature of 160° C. and a flow rate of 2000 kg/h. The bottom residue of the distillation has a temperature of 185° C. and a flow rate of 1111 kg/h.

First, the feed stream to the distillation is heated in a heat exchanger made from SSiC with the help the hot purified MSA from 50° C. to 88° C., while at the same time the purified MSA is cooled to 98° C. Then, the feed is further heated in a heat exchanger made from SSiC with the help of hot bottom residue to 112° C., while the bottom residue is cooled to 122° C. Afterwards the feed is heated to 170° C. with steam in a heat exchanger made from SSiC. For this 127 kJ/kg(MSA) are required. Finally, the purified MSA and the bottom residue of the distillation are cooled to 30° C. with cooling water using a heat exchanger made from glass-lined steel. These cooling operations require a cooling duty of 168 kJ/kg(MSA).

Compared to a process without heat integration (Comparative Example 1), in the inventive process the energy for heating up the feed to the distillation is reduced by 52% and the energy demand for cooling the hot streams leaving the distillation is reduced by 45%.

Example 2

In an example of the optimized process according to the present invention for the production of MSA from methane and SO3 with heat integration the feed to the distillation is first heated with the hot bottom residue and then with the hot purified MSA (see schematic illustration in FIG. 3). The stream leaving step C has a temperature of about 50° C. and the feed tray of the first distillation column has a temperature of 170° C. To produce 2000 kg/h of purified MSA, the feed to the distillation column has a flow rate of 3100 kg/h and consists of 75 wt.-% MSA and 25 wt.-% sulfuric acid with side products <<1 wt.-%. Purified MSA leaves the distillation step with a temperature of 160° C. and a flow rate of 2000 kg/h. The bottom residue of the distillation has a temperature of 185° C. and a flow rate of 1111 kg/h.

First, the feed stream to the distillation is heated with the help the bottom residue from 50° C. to 81° C., while at the same time the bottom residue is cooled to 91° C. Then, the feed is further heated with the help of hot purified MSA to 107° C., while MSA is cooled to 117° C. Afterwards the feed is heated to 170° C. For this 139 kJ/kg(MSA) are required. Finally, the purified MSA and the bottom residue of the distillation are cooled to 30° C. These cooling operations require a cooling duty of 85 kJ/kg(MSA).

Compared to a process without heat integration (Comparative Examples 1 and 2), in the inventive process the energy for heating up the feed to the distillation is reduced by 47% and the energy demand for cooling the hot streams leaving the distillation is reduced by 50%.

The invention claimed is:

1. A process for the production of alkanesulfonic acid from an alkane and $SO_3$ with an initiator comprising a distillation step, the distillation step comprising providing a feed comprising unpurified alkanesulfonic acid to at least one distillation column,
   wherein total energy consumption of the process is reduced by heat integration, and
   wherein the feed is heated by heat integration with a stream of purified alkanesulfonic acid leaving the distillation step, and/or the feed is heated by heat integration with a distillation residue leaving the distillation step, and/or the feed is first heated by heat integration with the stream of purified alkanesulfonic acid leaving the distillation step and then by heat integration with the distillation residue leaving the distillation step, and/or the feed is heated by heat integration with a stream from mixing the purified alkanesulfonic acid leaving the distillation step with water to yield an aqueous solution.

2. The process according to claim 1, comprising:
   a) synthesizing the initiator and reacting the alkane with the $SO_3$ in the presence of the initiator to form the unpurified alkanesulfonic acid,
   b) quenching a) to convert the $SO_3$ into a heavy boiler, c) removing unreacted alkane from b) by decompression to provide the feed,
d) performing the distillation step on the feed, and
e) discarding waste streams.

3. The process according to claim 1, wherein the alkane is methane and the alkanesulfonic acid is methanesulfonic acid.

4. The process according to claim 1, wherein the feed is further heated at a feeding point after the heat integration.

5. The process according to claim 1, wherein heat exchangers are used for heat integration.

6. The process according to claim 5, wherein the heat exchangers are monoliths made of pressureless sintered silicon carbide (SSIC).

7. The process according to claim 1, wherein heat in the heat integration is transferred from the stream of purified alkanesulfonic acid leaving the distillation step and/or the distillation residue leaving the distillation step to the feed directly without a heat transfer fluid in one apparatus per stream.

8. The process according to claim 1, wherein heat in the heat integration is transferred from the stream of purified alkanesulfonic acid leaving the distillation step and/or the distillation residue leaving the distillation step to the feed using a heat transfer fluid.

9. The process according to claim 1, wherein aliphatic and/or cyclic hydrocarbons and/or as silicon oils are used as heat transfer fluids for heat integration.

10. The process according to claim 2, wherein the quenching step is operated adiabatically.

11. The process according to claim 2, further comprising incinerating remaining alkane from the synthesis of the unpurified alkanesulfonic acid to supply heat to the process.

12. The process according to claim 11, wherein the heat supplied by incinerating the remaining alkane generates steam or heats up heat transfer fluids.

13. The process according to claim 11, wherein the remaining alkane is methane and the heat supplied by incinerating the methane heats up the feed or powers one or more evaporators of the distillation step.

14. The process according to claim 13, wherein the evaporators of the distillation step are powered by steam, and steam condensate coming from the evaporators of the distillation step is used to heat the feed.

15. The process according to claim 1, wherein energy released in one or more condensers of the distillation step is used to heat up the feed.

16. The process according to claim 5, wherein the heat exchangers are made of silicon carbide.

* * * * *